E. J. RETZBACH.
ICE CREAM BRICKING MACHINE.
APPLICATION FILED SEPT. 19, 1912.

1,288,442.

Patented Dec. 17, 1918.
4 SHEETS—SHEET 3.

Witnesses
Chas. B. Yoder
S. K. Hartog

Inventor
Edward J. Retzbach
By John H. Bruninga,
Atty.

E. J. RETZBACH.
ICE CREAM BRICKING MACHINE.
APPLICATION FILED SEPT. 19, 1912.
1,288,442.
Patented Dec. 17, 1918.
4 SHEETS—SHEET 4.
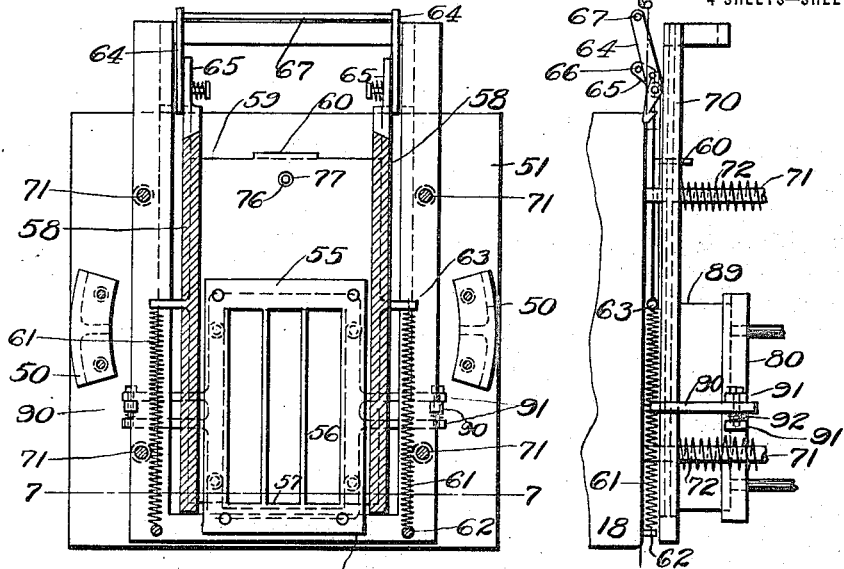
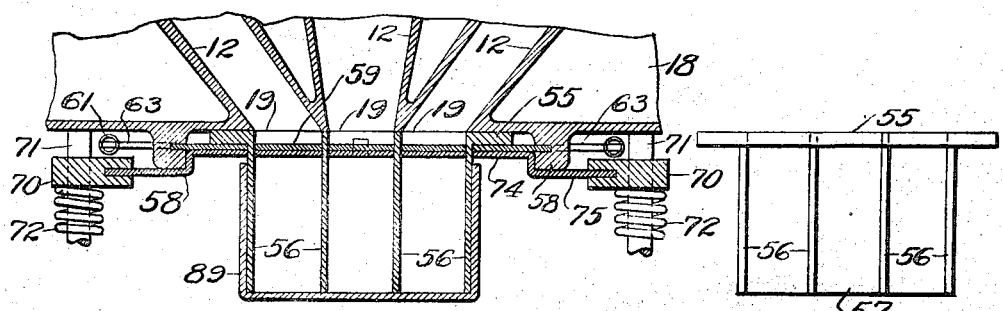
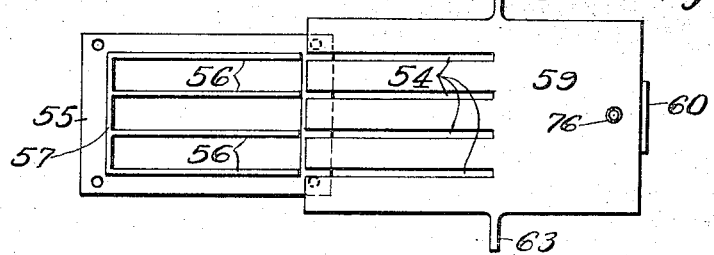
Witnesses
Chas B Yoder
S. W. Hartog
Inventor
Edward J. Retzbach
By John H. Bruninga,
Atty.

UNITED STATES PATENT OFFICE.

EDWARD J. RETZBACH, OF ST. LOUIS, MISSOURI, ASSIGNOR OF ONE-THIRD TO JOHN H. BRUNINGA, OF ST. LOUIS, MISSOURI.

ICE-CREAM-BRICKING MACHINE.

1,288,442.  Specification of Letters Patent.  Patented Dec. 17, 1918.

Application filed September 19, 1912. Serial No. 721,332.

*To all whom it may concern:*

Be it known that I, EDWARD J. RETZBACH, a citizen of the United States, and residing at St. Louis, in the State of Missouri, have invented certain new and useful Improvements in Ice-Cream-Bricking Machines, of which the following is a specification.

This invention relates to machines for forming ice cream or the like in layers to form a multiple layer brick or the like.

In the manufacture of ice cream bricks, having a series of layers of different flavors, as now practised, the ice cream in semi-frozen condition is spread in layers in a large flat receptacle, the whole is then frozen stiff, and when frozen is cut up into bricks. The entire operation is performed by hand, thus necessitating a large amount of labor. The operation must necessarily be performed in the open air and in an open receptacle so that the ice cream is exposed and is liable to melt, thus resulting in a large percentage of waste. Furthermore this hand method is unsanitary.

One of the objects of this invention therefore is to construct a machine or device which will form the ice cream or the like into a complete brick.

Another object is to construct a machine or device whereby the ice cream or the like is automatically deposited in layers to form a complete multiple layer brick.

Another object is to construct a machine which will form and discharge a brick without requiring handling of the ice cream during the forming operation.

Another object is to construct a machine which will form and deposit a brick into a box or receptacle, which receptacle is intended to retain the brick.

Figure 1:
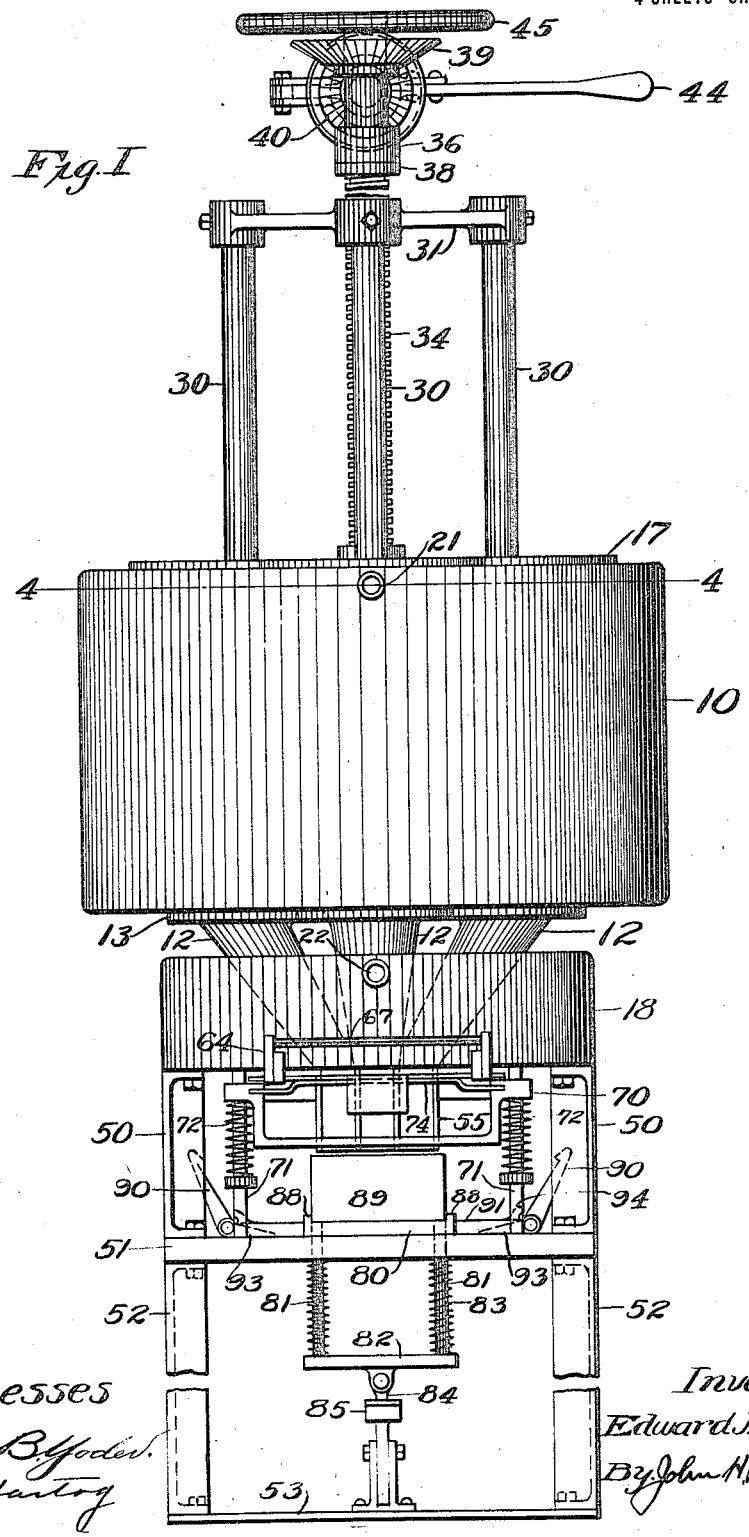
Figure 2:
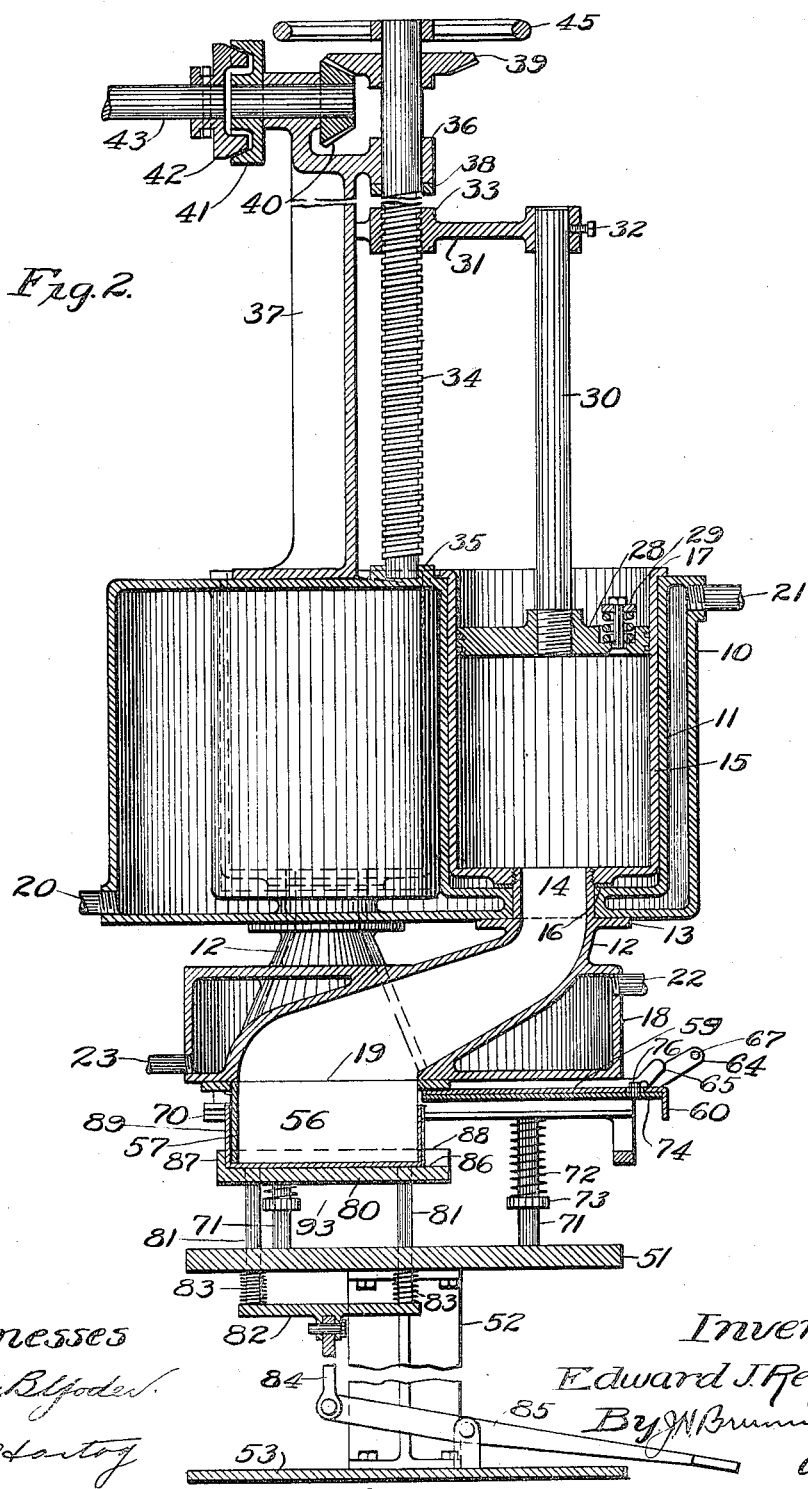
Figure 3:
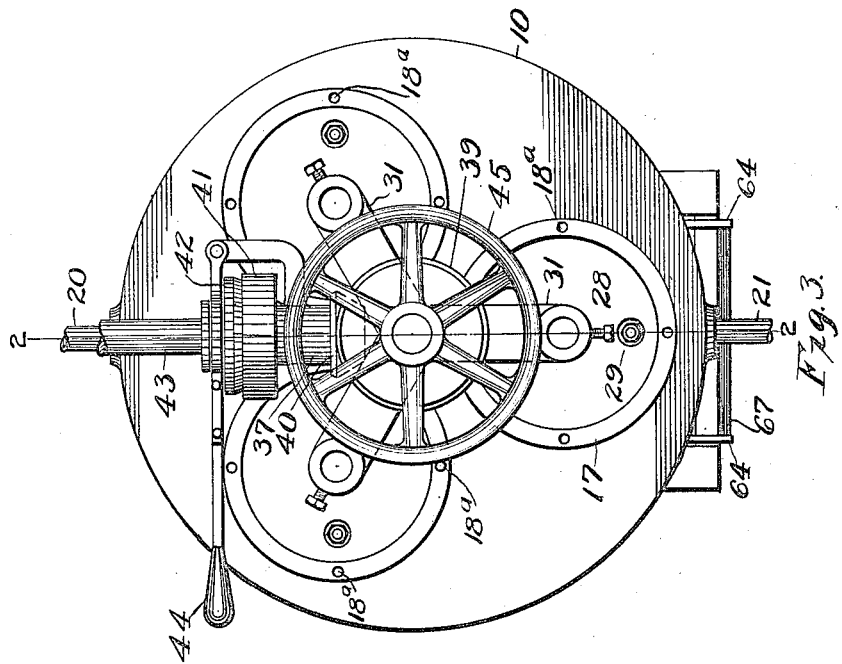
Figure 4:
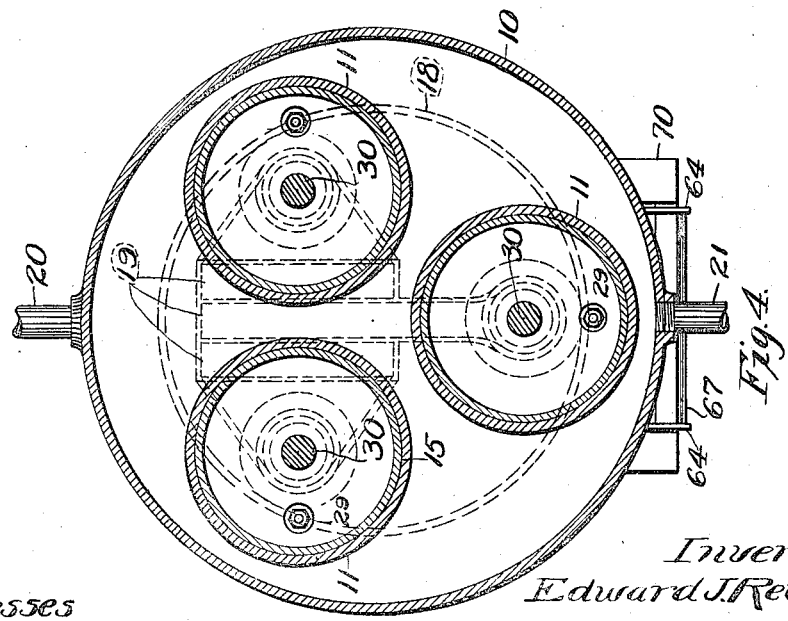

Another object is to construct a machine which will be simple in its construction, automatic in its operation and sanitary, and further objects will appear from the detail description taken in connection with the accompanying drawings, in which:

Figure 1 is a front elevation of a machine embodying this invention, showing the box support in lowered position, Fig. 2 is a section on the line 2—2 Fig. 3, showing the box support in raised position, Fig. 3 is a plan view, Fig. 4 is a section on the line 4—4, Fig. 1, Fig. 5 is a detail side elevation, taken from the left hand side of the machine, Fig. 1, Fig. 6 is a section on the line 6—6 Fig. 5, parts being shown in elevation, Fig. 7 is a section on the line 7—7 Fig. 6, Fig. 8 is a detail view of the form, and Fig. 9 is a bottom view of the form and one of the cut-off slides.

Referring to the accompanying drawings 10 designates a casting, which has cast integral therewith a plurality of cylinders 11 (in this case three) the casting being formed hollow to provide a jacket for the cylinders. A plurality of conduits 12 (in this case three) extend up into the cylinders and are provided with flanges 13 for securing the conduits to the casting 10. The necks or nipples 14 of these conduits are threaded as shown in Fig. 2, and the cylinders are provided with liners 15 screwed on the nipples 14, a gasket 16 being interposed to form a tight joint. The liners are provided with flanges 17 having holes 18ª therein adapted to receive a wrench or other tool for removing and replacing the liners. A casting 18 cast integral with the conduits 12 is formed hollow to provide a jacket around the conduits. The lower ends of the conduits 12 are located adjacently to form a series of adjacently positioned and oblong outlet or discharge passages 19 as shown in Figs. 1, 2 and 4. An inlet pipe 20 is connected to the lower end of the cylinder jacket and an outlet pipe 21 is connected to the upper end of this jacket. The conduit jacket is also provided with an inlet pipe 22 connected to its upper end, and with an outlet pipe 23 connected to its lower end.

The cylinders receive pistons 28 provided with piston rings or other suitable packing, and each of these pistons is also provided with an air valve 29 opening inwardly and normally retained in closed position by a spring as shown in Fig. 2. The pistons 28 are provided with piston rods 30 secured to a cross-head 31 by means of set screws 32. The hub 33 of the cross-head is threaded and receives a screw 34 mounted at its lower end in a thrust bearing 35 on the casting 10, and at its upper end in a bearing 36 on a standard 37 secured to the casting. A collar 38 on the screw limits the upward movement thereof. The screw has mounted thereon a bevel gear 39 meshing with a bevel gear 40 on a shaft mounted in a bearing in the standard 37 and connected with one member 41 of a friction clutch. The other member 42 of the friction clutch is splined on the shaft 43 and is operated by a shifting lever 44. The screw is also provided with a hand wheel 45 whereby it may be operated manually. When the clutch is thrown into operation the power shaft 43 will rotate the screw 34 and move the pistons downwardly in the cylinders. The pistons can be withdrawn by raising the cross-head by the hand wheel 45, or the shaft 43 may be provided with any suitable reversing mechanism. The parts are preferably so constructed that the pistons can be completely raised out of the cylinders by reversing the screw.

The casting 18 supports the casting 10 through the conduits 12. The casting 18 is in turn supported by brackets 50 from a table 51, which is in turn supported by brackets 52 from a base plate 53. A form 55, shown in detail in Figs. 8 and 9, is provided with a flange whereby it may be bolted or screwed to the under side of the casting 18, the flange and casting being machined to make a good joint. Extending down from this flange are a plurality of spaced blades 56 connected by an end wall 57, the other ends being left open as shown. The blades 56 and the end wall 57 thus form partitions or spacing members to divide the form into a plurality of compartments (in this case three). When the form is in position as shown in Figs. 2 and 7, the blades are so positioned that the compartments will be located underneath and form continuations of the outlets 19 of the conduits. This form is constructed to receive thereover a suitable receptacle, such as a standard ice cream box, as will be hereinafter fully described. A pair of lugs 58 are formed on the lower face of the casting 18 and these lugs are provided with guideways for a cut-off slide 59, which is slotted as shown at 54 so as to slide across the form and against the end wall 57 to close the outlet from the conduits 12. The cut-off slide is provided with a downwardly turned lug 60 whereby it may be operated. The cut-off slide is normally held closed by means of springs 61 secured at one of their ends to pins 62 on the casting 18 and at their other ends to laterally projecting lugs 63 on the cut-off slide 59, which lugs move in slots in the lugs 58. Spring actuated latches 64 are adapted to hook over the lugs 63 when the slide is retracted, these latches being mounted upon extensions 65 of the lugs 58 and held in engagement with laterally extending pins 66 on the lugs 65. The latches 64 are connected by a rod 67 extending across the machine so that both latches may be operated simultaneously to release the cut-off slide and permit it to close.

A skeleton frame 70 is mounted to slide on vertical rods or posts 71 supported between the casting 18 and the table 51, and this frame is normally held in raised position by means of springs 72 mounted on the rods 71 between the frame and collars 73 secured to the rods. The side members of the frame 70 have formed therein grooves to form guideways for a second cut-off slide 74. This cut-off slide lies against the cut-off slide 59, as shown in Figs. 1 and 6, and has extensions 75 engaging and moving in the guideways and engaging the lugs 58. The slide 74 has a pin 76 which is adapted to enter a slightly enlarged aperture 77 in the slide 59, so that these slides will be locked together when in the position shown in Figs. 2, 6 and 7, when they may be simultaneously opened and closed. It will be noted however, that while the cut-off slide 59 moves in stationary guideways, the cut-off slide 74 moves in guide-ways on a vertically movable frame 70. The slide 74 is otherwise of the same construction as the cut-off slide 59 as shown in Figs. 2, 6 and 7.

A box sustaining support or table 80 is mounted on vertical rods 81 passing through the table 51 and connected at their lower ends with and supported by a cross-head 82. Springs 83 on the rods 81 bear at their upper ends against the table 51 and at their lower ends against the cross-head 82 so as to normally retain the support 80 in lowered position as shown in Fig. 1. The support 80 is adapted to be raised through a link 84 connected to a treadle 85 mounted upon the base plate 53. The support 80 has formed therein a recess 86 open at its front end and closed at the back and sides by projecting portions 87 and 88 respectively. This recess is constructed to receive a standard ice cream box or receptacle 89 which is arranged to be pushed into place when the support 80 is in lowered position. The recess in the table positions the box in proper position underneath the form so that when the support 80 is raised by the treadle the box will be moved over the form.

A pair of pivoted latches 90 are mounted on lateral extensions 91 on the support 80 so as to move therewith, and the latches are normally moved inwardly into engagement with the stops 94 on the support 80 by means of springs 92. The latches are provided with tail pieces 93 adapted to engage the table 51 when the support 80 is lowered and throw the latches outwardly. These latches are arranged to snap over the frame 70 when the support is raised so that when the support is again lowered the latches will carry the frame 70 with it to cause the slide 74 to move downwardly on the form and discharge the contents of the form into the box as the box passes off of the form. When however, the support 80 with the box moves down, carrying the latches and the frame 70 with it, the tail-pieces 93 will engage the table 51 near the end of the downward movement of the support 80, and will throw the latches outwardly so as to release the frame and permit the springs 72 to move it back to raised position. The tail-pieces 93 are so constructed and positioned that the frame 70 will be released when the lower face of the cut-off slide 74 is just about flush with the lower end of the blades 56, or when the slide 74 has not quite passed off the form. It will be noted that the pin 76, moves with the slide 74 in a downward direction but immediately engages with the aperture 77 when the frame and the slide are carried back.

The operation of the machine is as follows:

The cylinder water jacket is filled with cold brine which enters at 20 and is discharged at 21, the brine being kept circulated by a pump or the like so as to keep the ice cream in a semi-frozen state. The conduit jacket is however, filled with warm water, which enters at 22 and is discharged at 23, and is also circulated by a suitable pump, and this jacket keeps the conduits and the form at a warm temperature. The provision of the conduit water jacket is important, since it is found that ice cream in a semi-frozen state will readily change into a rigid state and will stick to and clog the conduits and the form. When however, the conduits, the discharge passages thereof and the form are kept at a warm temperature then such sticking to the inside surface of the conduits will be prevented. It is obvious of course that the temperature of the water need only to be sufficiently high to prevent the freezing of the ice cream to the conduits and to prevent clogging. It will also be noted that the conduits increase in area toward their discharge end; this will also obviate and prevent clogging.

The cylinders or containers are filled with ice cream of different flavors in a semi-frozen state. To fill the machine, the cross-head is raised to withdraw the pistons out of the cylinders, and the pistons are again inserted after filling. The cut-off slides are released and held closed by the springs 61. The clutch is now thrown in and the pistons moved down until the ice cream appears at the cut-off slides, and the clutch is then thrown out. A box 89 is placed on the box support 80 and the support raised to place the box over the form, the support being stopped by the engagement of its bottom with the bottom of the blades 56 of the form. The cut-off slides are now retracted and locked in retracted position by the latches 64. The clutch is now again thrown in and the pistons moved down until the box is filled. The standard 37 may be provided with a scale and the cross-head 31 with a pointer so as to indicate the movement of the pistons, and this scale may be graduated for boxes of different depths and sizes. After the box is filled, as indicated in any suitable manner, the cut-off slides are closed by releasing the latches 64, thereby cutting off the supply of the ice cream to the box. The treadle 85 is now released when the springs 83 will operate to carry the support 80 down, the latches 90 moving with the table and carrying with them the frame 70 and therefore the lower cut-off 74 so as to scrape the ice cream off of the form and withdraw the box from the form. As the support 80 nears its lower limit the frame 70 and its cut-off slide 74 will be automatically released so as to move back into original position against the cut-off slide 59. The box can now be removed from the support 80 and another box placed therein. These filled boxes are then placed in cold storage and there frozen stiff. The boxes can be lined with tissue paper if so desired.

The ice cream is discharged from the separate cylinders or containers into the separate compartments formed inside of the box. The ice cream will therefore be deposited in separate adjacent layers separated by the inside separators or ribs 56. When the ice cream deposited in the box is withdrawn with the box from the form the ice cream is left in the box in layers. It will be understood that the separators 56 can be made thin, and the ice cream being in a semi-frozen condition will unite into a solid brick. In order to compensate for the space taken up by the separators, and in order to obtain a full box, the length of the blades 56 is so proportioned as to leave a slight space between the upper end of the box and the lower face of the lower cut-off slide 74 as shown in Fig. 7, so that the box will be heaped and will therefore fill practically flush when the separators are withdrawn.

It will therefore be seen that the invention accomplishes its objects. The ice cream is deposited and formed into a multiple layer brick and is discharged in a condition ready to be sold in the box after it is frozen stiff. The operation of the machine is entirely automatic so that the formation of the bricks can be performed very quickly.

The liner 15, the conduits 12, and the form and its cut-off slides are preferably constructed of a non-corrodible metal such as aluminum. This will keep the ice cream in a sanitary condition. In view of the fact that the ice cream is not handled at all after being placed in the cylinders the device is sanitary in its operation. Since the ice cream is kept out of contact with the air, and since the operation of forming a brick can be performed very rapidly, no waste will result.

While the machine is especially adapted for making ice cream in brick form comprising different flavored layers, it is obvious that its application is not limited to this particular use, since it may be used where confectionery materials other than ice cream are to be formed into a multiple layer brick, cake or the like. It is therefore to be understood that the invention is not to be limited for use with ice cream.

While only one embodiment of this invention has been shown and described, it will be obvious that the invention may be embodied in different forms. It is also obvious that various changes may be made in details of construction without departing from this invention, and it is therefore to be understood that this invention is not to be limited to the specific construction shown and described.

Having thus described the invention what is claimed is:

1. In a machine of the class described, the combination with a plurality of ice cream containers, of means connected with said containers and adapted to receive the ice cream in semi-frozen condition therefrom constructed and arranged to assemble the semi-frozen ice cream to form a multiple layer brick, and means for forcing the semi-frozen ice cream from said containers to said assembling means whereby the ice cream is positively discharged from the containers and the formation of the brick is perfected under pressure.

2. In a machine of the class described, the combination with a plurality of ice cream containers, of means connected with said containers and adapted to receive the ice-cream in semi-frozen condition therefrom constructed and arranged to assemble the semi-frozen ice cream to form a multiple layer brick, means for forcing the semi-frozen ice cream from said containers to said assembling means whereby the ice cream is positively discharged from the containers and the formation of the brick is perfected under pressure, and means for discharging the assembled brick.

3. In a machine of the class described, the combination with a plurality of ice cream containers, of means connected with said containers and receiving the ice cream in semi-frozen condition therefrom constructed to assemble the semi-frozen ice cream to form a multiple layer brick, means for forcing the semi-frozen ice cream from said containers to said assembling means, and means for heating said assembling means.

4. In a machine of the class described, the combination with a plurality of ice cream containers, of receptacle sustaining means, means connected with said containers and adapted to receive the ice cream in semi-frozen condition therefrom constructed and arranged to assemble and deposit in said receptacle a multiple layer brick, and means for forcing the semi-frozen ice cream from said containers to said depositing means whereby the ice cream is positively discharged from the containers and the formation of the brick is perfected under pressure.

5. In a machine of the class described, the combination with a plurality of ice cream containers, of a form connected with said containers and adapted to receive the ice cream in semi-frozen condition therefrom constructed and arranged to assemble and form a multiple layer brick, and means for forcing the semi-frozen ice cream from said containers to said form whereby the ice cream is positively discharged from the containers and the formation of the brick is perfected under pressure.

6. In a machine of the class described, the combination with a plurality of ice cream containers, of a form connected with said containers and adapted to receive the ice cream in semi-frozen condition therefrom constructed and arranged to assemble and form a multiple layer brick, means for forcing the semi-frozen ice cream from said containers to said form whereby the ice cream is positively discharged from the containers and the formation of the brick is perfected under pressure, and a cut-off for controlling the supply of ice cream to said form.

7. In a machine of the class described, the combination with a plurality of ice cream containers, of a form connected with said containers and adapted to receive the ice cream in semi-frozen condition therefrom constructed and arranged to assemble and form a multiple layer brick, means for forcing the semi-frozen ice cream from said containers to said form, and means for discharging the brick from said form.

8. In a machine of the class described, the combination with a plurality of ice cream containers, of a form connected with said containers and receiving the ice cream therefrom constructed to form a multiple layer brick, means for forcing the ice cream from said containers to said form, and a cut-off for said form adapted to discharge the brick therefrom.

9. In a machine of the class described, the combination with an ice cream supply, of receptacle sustaining means, means connected to and adapted to receive the ice cream in semi-frozen condition from said supply constructed and arranged to form and deposit a brick in the receptacle, and means for forcing the ice cream from said supply to said forming and depositing means whereby the formation of a brick in the receptacle is perfected under pressure.

10. In a machine of the class described, the combination with an ice cream supply, of receptacle sustaining means, means connected to and adapted to receive the ice cream in semi-frozen condition from said supply constructed and arranged to form and deposit a brick in the receptacle, means for forcing the ice cream from said supply to said forming and depositing means whereby the formation of a brick in the receptacle is perfected under pressure, and means for discharging the formed brick.

11. In a machine of the class described, the combination with an ice cream supply, of a form adapted to receive a receptacle thereover, said form being connected to and adapted to receive the ice cream from said supply and constructed and arranged to form and deposit a brick in the receptacle, and means for forcing the ice cream from said supply to said form whereby the formation of a brick in the receptacle is perfected under pressure.

12. In a machine of the class described, the combination with an ice cream supply, of a form adapted to receive a receptacle thereover, said form being connected to and receiving the ice cream from said supply and constructed to form and deposit a brick in the receptacle, and means for discharging the formed brick together with the receptacle from said form.

13. In a machine of the class described, the combination with an ice cream supply, of a form adapted to receive a receptacle thereover, said form being connected to and receiving the ice cream from said supply and constructed to form and deposit a brick in the receptacle, and a scraper moving along said form to discharge the formed brick.

14. In a machine of the class described, the combination with an ice cream supply, of a form adapted to receive a receptacle thereover, said form being connected to and receiving the ice cream from said supply and constructed to form and deposit a brick in the receptacle, and a cut-off adapted to discharge the formed brick.

15. In a machine of the class described, the combination with an ice cream supply, of a form adapted to permit a receptacle to be placed thereover and removed therefrom, said form being connected to and receiving the ice cream from said supply and constructed to form and deposit a brick in the receptacle.

16. In a machine of the class described, the combination with an ice cream supply, of a form adapted to receive a receptacle thereover, said form having a connection to and receiving the ice cream from said supply and constructed to form and deposit a brick in said receptacle, and provisions for heating the connection between said supply and said form.

17. In a machine of the class described, the combination with an ice cream supply, of receptacle sustaining means, means connected to and adapted to receive the ice cream in semi-frozen condition from said supply constructed and arranged to form a brick under pressure and deposit the formed brick in the receptacle, and means for removing the receptacle with the brick from the form.

18. In a machine of the class described, the combination with an ice cream supply, of a form adapted to receive a receptacle thereover, said form being connected to and receiving the ice cream from said supply and constructed to form and deposit a brick in the receptacle, and a movable receptacle support.

19. In a machine of the class described, the combination with an ice cream supply, of receptacle sustaining means, means connected to and receiving the ice cream from said supply and constructed to form and deposit a brick in the receptacle, and means for moving the receptacle into correct position with respect to said forming and depositing means.

20. In a machine of the class described, the combination with an ice cream supply, of a form adapted to receive a receptacle thereover, said form being connected to and receiving the ice cream from said supply, and constructed to form and deposit a brick in the receptacle, and a movable receptacle support adapted to position the receptacle with respect to said form.

21. In a machine of the class described, the combination with an ice cream supply, of a form adapted to receive a receptacle thereover, said form being connected to and receiving the ice cream from said supply, and constructed to form and deposit a brick in the receptacle, and means for moving the receptacle support into and out of position over said form.

22. In a machine of the class described, the combination with an ice cream supply, of a form adapted to receive a receptacle thereover, said form being connected to and receiving the ice cream from said supply and constructed to form and deposit a brick in the receptacle, and a receptacle support adapted to move the receptacle into and out of position over said form and having provisions for positioning the receptacle.

23. In a machine of the class described, the combination with a plurality of ice cream containers, of assembling means having a plurality of compartments, conduits connecting each compartment with one of said containers, constructed and arranged to assemble the ice cream to form a brick, and means for forcing the ice cream in semi-frozen condition from said containers to said assembling means whereby the ice cream is positively discharged from the containers and the formation of the brick is perfected under pressure.

24. In a machine of the class described, the combination with a plurality of ice cream containers, of a form, conduits for connecting said form with said containers, means for forcing the ice cream from the containers into said form whereby the ice cream is positively discharged from the containers and the formation of the brick is perfected under pressure, and means for withdrawing the formed brick from said form.

25. In a machine of the class described, the combination with a plurality of ice cream containers, of receptacle receiving means, separators adapted to enter the receptacle and form a plurality of compartments therein, and means for forcing the ice cream from said containers into the compartments so formed whereby the ice cream is positively discharged from the containers and the formation of the brick in the receptacle is perfected under pressure.

26. In a machine of the class described, the combination with a plurality of ice cream containers, of a form adapted to receive a receptacle thereover, means for discharging ice cream from said containers into said form to form a brick, and means for withdrawing the formed brick from said form.

27. In a machine of the class described, the combination with a plurality of ice cream containers, of a form connected with said containers, and receptacle sustaining means adapted to move a receptacle into and out of coöperative relation with said form.

28. In a machine of the class described, the combination with a plurality of ice cream containers, of a form connected with said containers, and receptacle sustaining means below said form and movable vertically into and out of coöperative relation with respect to said form.

29. In a machine of the class described, the combination with a plurality of ice cream containers, of a form connected with said containers, a receptacle support, means for discharging the ice cream from said form, and means for moving said support and said discharging means.

30. In a machine of the class described, the combination with a plurality of ice cream containers, of a form connected with said containers, a receptacle support, and means for discharging the ice cream from said form connected with and movable with said support.

31. In a machine of the class described, the combination with a plurality of ice cream containers, of a form connected with said containers, a receptacle support, means for discharging the ice cream from said form connected with and movable with said support, and means for automatically disconnecting said discharging means from said support.

32. In a machine of the class described, the combination with a plurality of ice cream containers, of a form connected with said containers, a cut-off for said form, and a receptacle support having means for operating said cut-off.

33. In a machine of the class described, the combination with a plurality of ice cream containers, of a form connected with said containers, and a plurality of cut-offs for said form, one of said cut-offs being movable to discharge the contents of the form.

34. In a machine of the class described, the combination with a plurality of ice cream containers, of an immovable form connected with said containers, and a means for scraping the ice cream from said form.

35. In a machine of the class described, the combination with a plurality of ice cream containers, of an immovable form connected with said containers, and a cut-off constructed to scrape the ice cream from said form.

36. In a machine of the class described, the combination with a plurality of ice cream containers, of a form connected with said containers, a member movable across said form to cut off the ice cream, and a member movable along said form to scrape the ice cream from said form.

37. In a machine of the class described, the combination with a plurality of ice cream containers, of a form connected with said containers, a cut-off member movable across said form, and a second cut-off member movable across said form to cut off the ice cream and movable along said form to scrape the ice cream from said form.

38. In a machine of the class described, the combination with a plurality of ice cream containers, of a form connected with said containers, a movable receptacle support, and a cut-off member movable with said support along said form.

39. In a machine of the class described, the combination with a plurality of ice cream containers, of a form connected with said containers to discharge the ice cream into a receptacle, said form being of greater depth than the receptacle to fill the receptacle above its edge.

40. In a machine of the class described, the combination with a plurality of ice cream containers, of a form connected with said containers adapted to receive a receptacle thereover, said form having a partition to divide the receptacle into a plurality of compartments, and said form being of greater depth than the receptacle to compensate for said partition.

41. In a machine of the class described, an ice cream form adapted to receive a receptacle thereover, said form having separating means constructed to divide the receptacle into a plurality of compartments and constructed to form and deposit the ice cream in the receptacle as a brick having a plurality of layers, and said form being of greater depth than the receptacle to compensate for said separating means.

42. In a machine of the class described, the combination with an ice cream container, of a form connected with said container and adapted to receive the ice cream therefrom to form a brick, means for forcing the ice cream from said container into said form and a heating jacket adapted to heat said form.

43. In a machine of the class described, the combination with an ice cream container, of a form adapted to form a brick, a conduit from said container to said form, means for forcing the ice cream from said container through said conduit and a heating jacket for said conduit.

44. In a machine of the class described, the combination with an ice cream container, of a form adapted to form a brick, a conduit connecting said container with said form, means for forcing the ice cream from said container through said conduit, a cooling jacket for said container, and a heating jacket for said conduit.

45. In a machine of the class described, the combination with a plurality of ice cream containers, of a form adapted to form a multiple layer brick, conduits from said containers to said form, means for forcing the ice cream from said container through said conduit, and a heating jacket for said conduits.

46. In a machine of the class described, the combination with a plurality of ice cream containers, of a form adapted to form a multiple layer brick, conduits from said containers to said form, means for forcing the ice cream from said container through said conduit, cooling jackets for said containers, and heating jackets for said conduits.

47. In a machine of the class described, the combination with a plurality of ice cream containers, of means positioned below and connected with said containers and adapted to receive the ice cream in semi-frozen condition therefrom constructed and arranged to assemble the semi-frozen ice cream to form a multiple layer brick, and means for forcing the ice cream from said containers to said assembling means whereby the ice cream is positively discharged from the containers and the formation of the brick is perfected under pressure.

48. In a machine of the class described, the combination with a plurality of ice cream containers, of a form positioned below said containers and constructed to receive ice cream in semi-frozen condition to form a multiple layer brick, conduits connecting said containers with said form, and means for forcing the semi-frozen ice cream from said containers to said form whereby the ice cream is positively discharged from the containers and the formation of the brick is perfected under pressure.

49. In a machine of the class described, the combination with a plurality of ice cream containers, of a form positioned below said containers and constructed to receive ice cream to form a multiple layer brick, conduits connecting said containers with said form, means for forcing the ice cream from said containers to said form, and means for controlling the temperature of said conduits.

50. In a machine of the class described, the combination with a plurality of ice cream containers, of a form positioned below said containers and constructed to receive ice cream in semi-frozen condition to form a multiple layer brick, conduits connecting said containers with said form, means for forcing the semi-frozen ice cream from said containers to said form, and means for controlling the temperature of said containers.

51. In a machine of the class described, the combination with a plurality of ice cream containers, of a form positioned below said containers and constructed to receive ice cream in semi-frozen condition to form a multiple layer brick, conduits connecting said containers with said form, means for forcing the ice cream from said containers to said form, and means for controlling the temperature of said form.

52. In a machine of the class described, the combination with a plurality of ice cream containers, of a form constructed to receive ice cream to form a multiple layer brick, conduits connecting said containers with said form, a cut-off for controlling the supply to said form, and means for forcing the ice cream from said containers to said form whereby the ice cream is positively discharged from the containers and the formation of the brick is perfected under pressure.

53. In a machine of the class described, the combination with a plurality of ice cream containers, of a form constructed to receive ice cream to form a multiple layer brick, conduits connecting said containers with said form, a plurality of cut-offs for controlling the supply to said form, and means for forcing the ice cream from said containers to said form whereby the ice cream is positively discharged from the containers and the formation of the brick is perfected under pressure.

54. In a machine of the class described, the combination with a plurality of ice cream containers, of a form constructed to receive ice cream to form a multiple layer brick, conduits connecting said containers with said form, a plurality of cut-offs for controlling the supply to said form, one of said cut-offs being movable along said form to discharge the contents thereof, and means for forcing the ice cream from said containers to said form.

55. In a machine of the class described, the combination with a plurality of ice cream containers, of a form constructed to provide a plurality of compartments to form a multiple layer brick, conduits connecting the respective containers with the respective compartments, means for controlling the supply to said form, and means for forcing the ice cream from said containers to said form whereby the ice cream is positively discharged from the containers and the formation of the brick is perfected under pressure.

56. In a machine of the class described, the combination with a plurality of ice cream containers, of a form positioned below said containers, constructed to provide a plurality of compartments to form a multiple layer brick, conduits connecting the respective containers with the respective compartments, means for controlling the supply to said form, and means for forcing the ice cream from said containers to said form whereby the ice cream is positively discharged from the containers and the formation of the brick is perfected under pressure.

57. In a machine of the class described, the combination with a plurality of ice cream containers, of a form constructed to provide a plurality of compartments to form a multiple layer brick, conduits connecting the respective containers with the respective compartments, means for controlling the supply to said form, means for forcing the ice cream from said containers to said form, and means for controlling the temperature of said conduits.

58. In a machine of the class described, the combination with a plurality of ice cream containers, of a form adapted to receive a receptacle and constructed to provide a plurality of compartments in said receptacle, conduits connecting the respective containers with the respective compartments, and means for forcing the ice cream from said containers to said form to deposit a multiple layer brick under pressure in the receptacle whereby the ice cream is positively discharged from the containers and the formation of the brick in the receptacle is perfected under pressure.

59. In a machine of the class described, the combination with a plurality of ice cream containers, of a form adapted to receive a receptacle and constructed to provide a plurality of compartments in said receptacle, conduits connecting the respective containers with the respective compartments, means for controlling the supply to said form, and means for forcing the ice cream from said containers to said form to deposit a multiple layer brick under pressure in the receptacle whereby the ice cream is positively discharged from the containers and the formation of the brick in the receptacle is perfected under pressure.

60. In a machine of the class described, the combination with a plurality of ice cream containers, of a form adapted to receive a receptacle and constructed to provide a plurality of compartments in said receptacle, conduits connecting the respective containers with the respective compartments, a plurality of cut-offs for controlling the supply to said form, and means for forcing the ice cream from said containers to said form to deposit a multiple layer brick under pressure in the receptacle whereby the ice cream is positively discharged from the containers and the formation of the brick in the receptacle is perfected under pressure.

61. In a machine of the class described, the combination with a plurality of ice cream containers, of a form adapted to receive a receptacle and constructed to provide a plurality of compartments in said receptacle, conduits connecting the respective containers with the respective compartments, means for forcing the ice cream from said containers to said form to deposit a multiple layer brick under pressure in the receptacle, whereby the ice cream is positively discharged from the containers and the formation of the brick in the receptacle is perfected under pressure, and means for controlling the supply to said form and for discharging the brick from said form.

62. In a machine of the class described, the combination with a plurality of ice cream containers, of a form adapted to receive a receptacle and constructed to provide a plurality of compartments in said receptacle, conduits connecting the respective containers with the respective compartments, means for controlling the supply to said form, means for forcing the ice cream from said containers to said form to deposit a multiple layer brick in the receptacle, and means for scraping the brick from said form.

63. In a machine of the class described, the combination with a plurality of ice cream containers, of a form adapted to receive a receptacle and constructed to provide a plurality of compartments in said receptacle, conduits connecting the respective containers with the respective compartments, means for forcing the ice cream from said containers to said form to deposit a multiple layer brick under pressure in the receptacle whereby the ice cream is positively discharged from the containers and the formation of the brick in the receptacle is perfected under pressure, and means for discharging the brick from said form.

64. In a machine of the class described, the combination with a plurality of ice cream containers, of a form adapted to receive a receptacle and constructed to provide a plurality of compartments in said receptacle, conduits connecting the respective containers with the respective compartments, means for forcing the ice cream from said containers to said form to deposit a multiple layer brick in the receptacle, and means for discharging the brick together with the receptacle from said form.

65. In a machine of the class described, the combination with a plurality of ice cream containers, of a form adapted to receive a receptacle and constructed to provide a plurality of compartments in said receptacle, conduits connecting the respective containers with the respective compartments, means for forcing the ice cream from said containers to said form to deposit a multiple layer brick under pressure in the receptacle whereby the ice cream is positively discharged from the containers and the formation of the brick in the receptacle is perfected under pressure, and a cut-off movable across said form and over said receptacle.

66. In a machine of the class described, the combination with a plurality of ice cream containers, of a form adapted to receive a receptacle and constructed to provide a plurality of compartments in said receptacle, conduits connecting the respective containers with the respective compartments, means for forcing the ice cream from said containers to said form to deposit a multiple layer brick in the receptacle, and a cut-off movable across said form and over said receptacle, constructed to discharge said brick from said form.

67. In a machine of the class described, the combination with a plurality of ice cream containers, of a form adapted to receive a receptacle and constructed to provide a plurality of compartments in said receptacle, conduits connecting the respective containers with the respective compartments, means for forcing the ice cream from said containers to said form to deposit a multiple layer brick in the receptacle, and a cut-off movable across said form and over said receptacle to cut off the supply, and movable along said form to discharge the brick.

68. In a machine of the class described, the combination with a plurality of ice cream containers, of a form positioned below said containers, adapted to receive a receptacle and constructed to provide a plurality of compartments in said receptacle, conduits connecting the respective containers with the respective compartments, and means for forcing the ice cream from said containers to said form to deposit a multiple layer brick under pressure in the receptacle, whereby the ice cream is positively discharged from the containers and the formation of the brick in the receptacle is perfected under pressure.

69. In a machine of the class described, the combination with a plurality of ice cream containers, of a form positioned below said containers, adapted to receive a receptacle and constructed to provide a plurality of compartments in said receptacle, conduits connecting the respective containers with the respective compartments, means for forcing the ice cream from said containers to said form to deposit a multiple layer brick in the receptacle, and means for controlling the temperature of said containers.

70. In a machine of the class described, the combination with a plurality of ice cream containers, of a form positioned below said containers, adapted to receive a receptacle and constructed to provide a plurality of compartments in said receptacle, conduits connecting the respective containers with the respective compartments, means for forcing the ice cream from said containers to said form to deposit a multiple layer brick in the receptacle, and means for controlling the temperature of said conduits.

71. In a machine of the class described, the combination with a plurality of ice cream containers, of a form positioned below said containers, adapted to receive a receptacle and constructed to provide a plurality of compartments in said receptacle, conduits connecting the respective containers with the respective compartments, means for forcing the ice cream from said containers to said form to deposit a multiple layer brick in the receptacle, and means for controlling the temperature of said form.

72. In a machine of the class described, the combination with a plurality of ice cream containers, of a form adapted to receive a receptacle and constructed to provide a plurality of compartments in said receptacle, conduits connecting the respective containers with the respective compartments, and pistons for forcing the ice cream from said containers to said form to deposit a multiple layer brick under pressure in said receptacle, whereby the ice cream is positively discharged from the containers and the formation of the brick in the receptacle is perfected under pressure.

In testimony whereof I affix my signature in presence of two witnesses.

EDWARD J. RETZBACH.

Witnesses:
J. H. BRUNINGA,
L. C. RETZBACH.